Jan. 24, 1928.
W. H. McKISSICK
1,657,131
COMBINED TUBING BLEEDER, VALVE, AND TRAP
Filed April 13, 1927     5 Sheets-Sheet 1
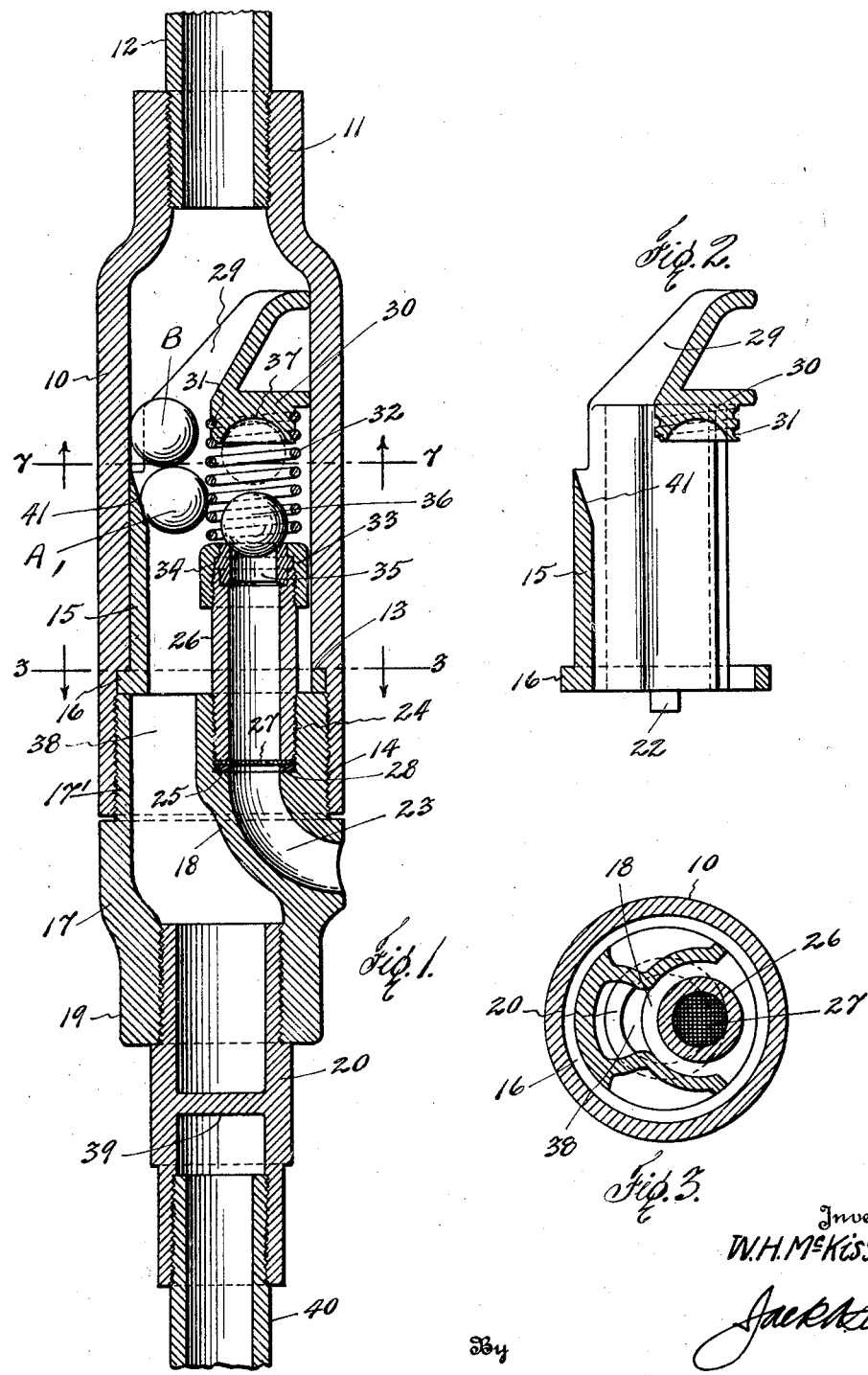

Jan. 24, 1928.  1,657,131
W. H. McKISSICK
COMBINED TUBING BLEEDER, VALVE, AND TRAP
Filed April 13, 1927    5 Sheets-Sheet 2
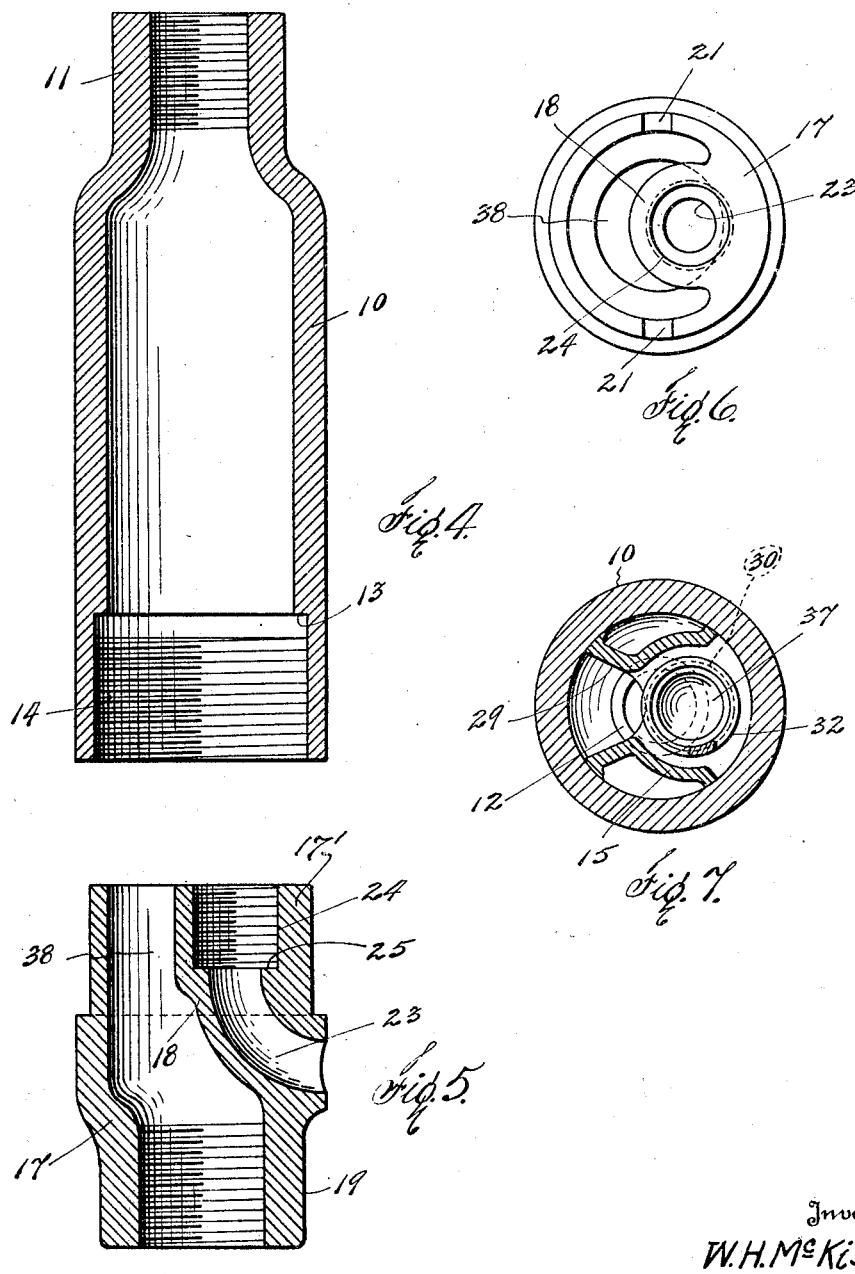
Inventor
W. H. McKissick
By
Attorney

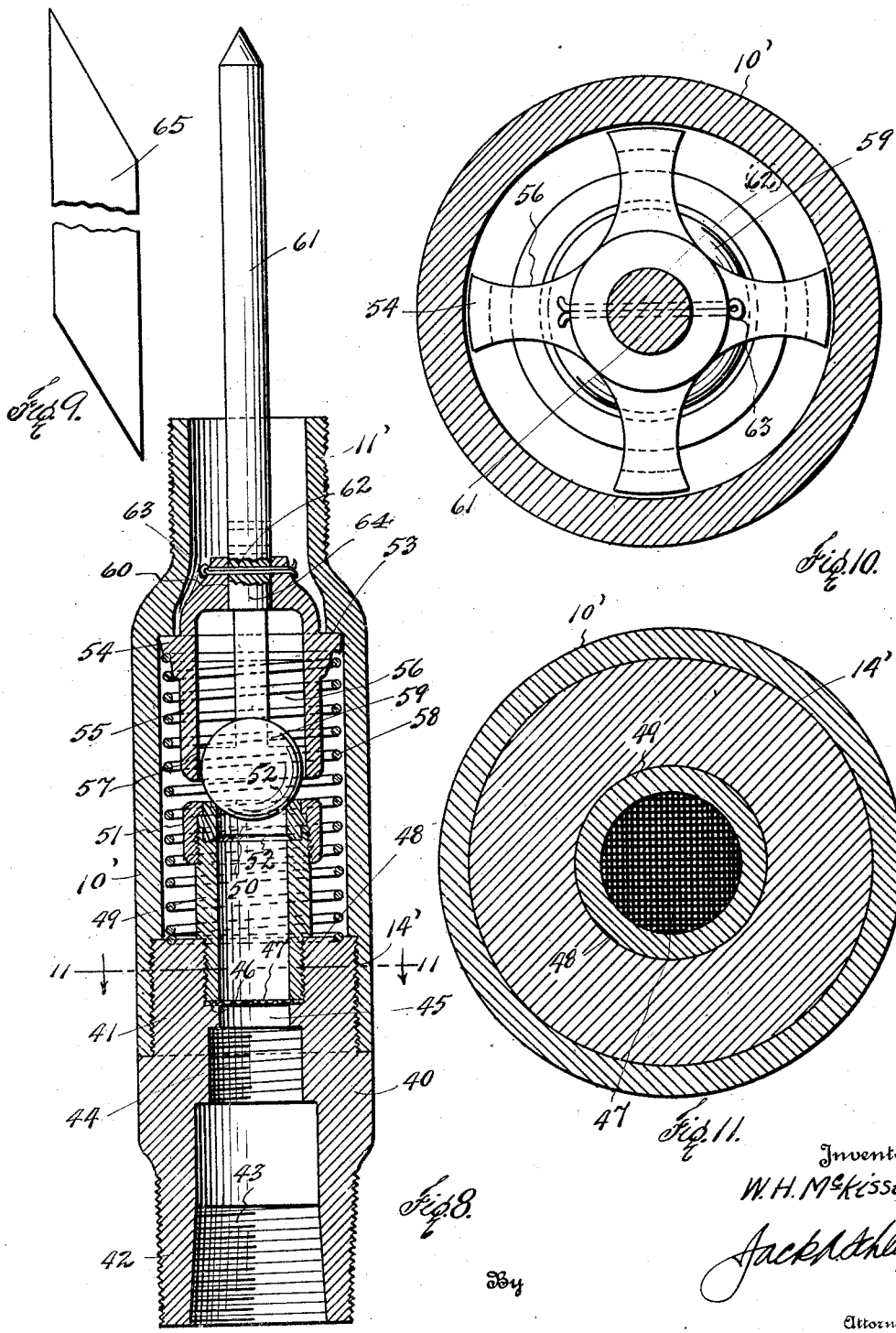

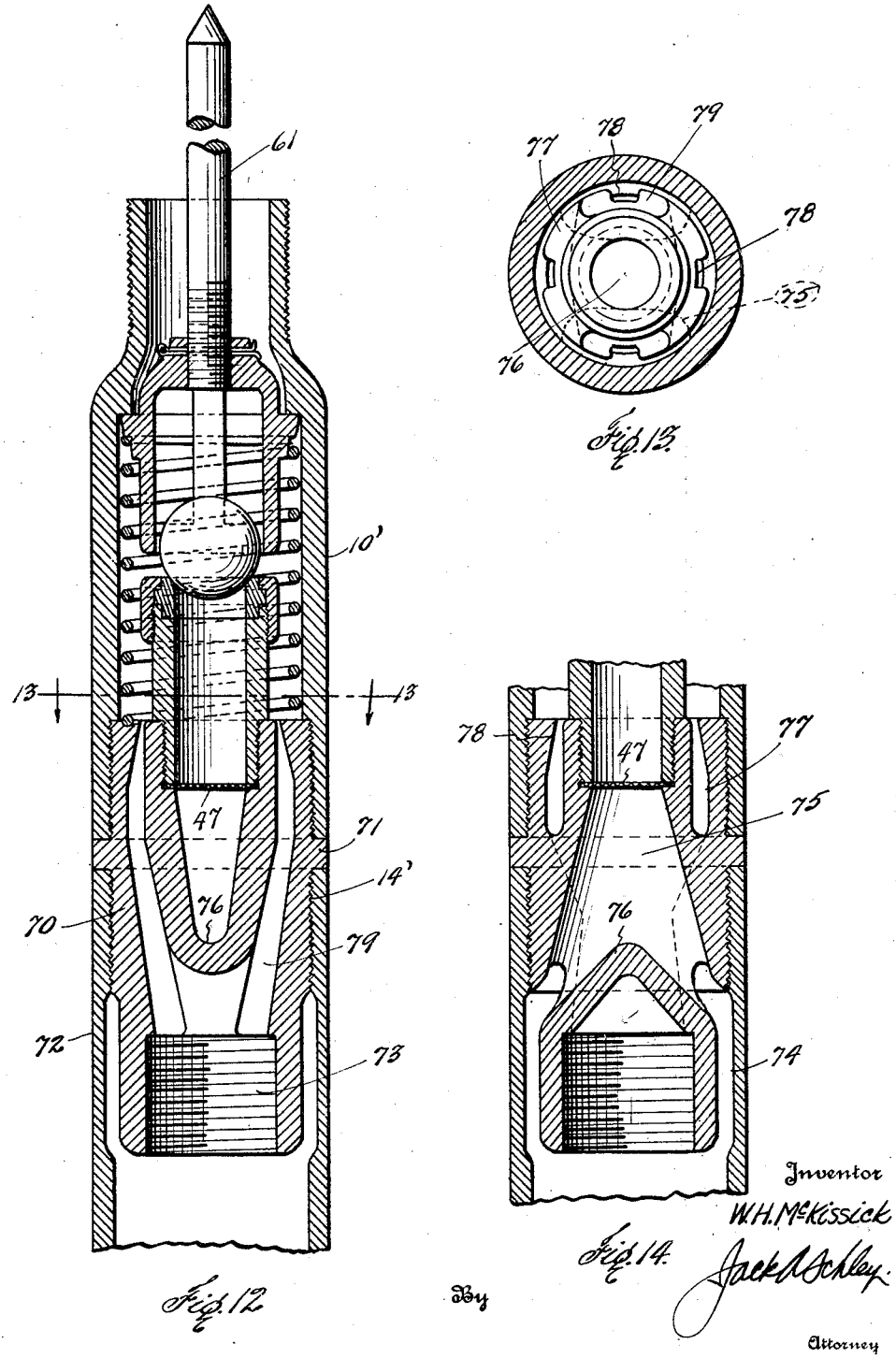

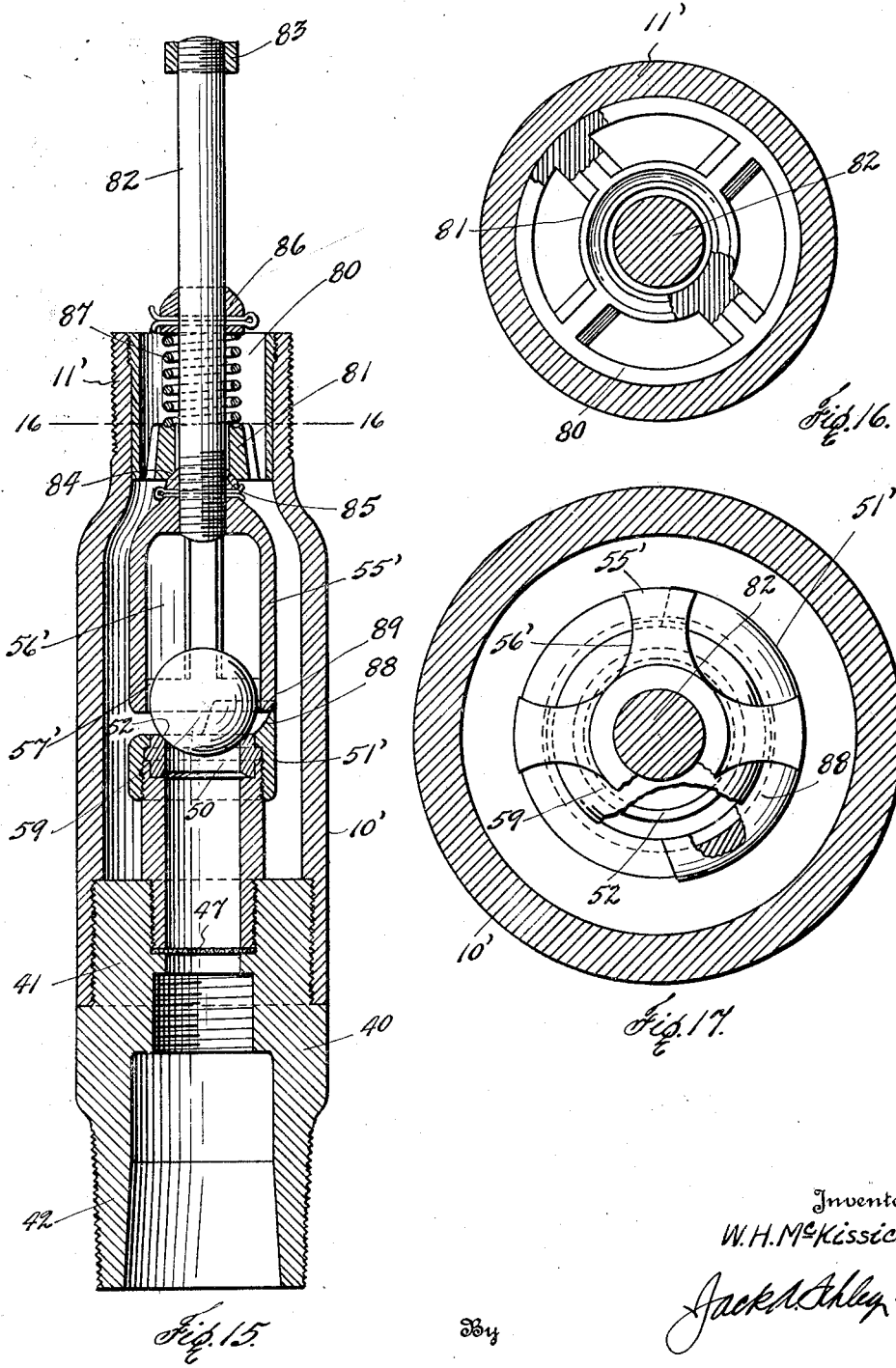

Patented Jan. 24, 1928.

1,657,131

UNITED STATES PATENT OFFICE.

WILLIAM H. McKISSICK, OF TULSA, OKLAHOMA.

COMBINED TUBING BLEEDER, VALVE, AND TRAP.

Application filed April 13, 1927. Serial No. 183,560.

This invention relates to new and useful improvements in combined tubing bleeders, valves and traps.

The principal object of the invention is to provide an economical device for use in a pumping well, whereby the standing valve may be combined with a tubing bleeder and a sand trap.

Another object of the invention is to provide in connection with the standing valve a simple screen located below the valve seat so as to keep out trash and other foreign matter which might lodge on the valve seat or clog the device.

A particular object of the invention is to provide a displaceable cage for the valve, serving the dual function of retaining the valve and guiding it to its seat, as well as moving it laterally from its seat when the cage is displaced to bleed the tubing.

Another important feature of the invention is a sand trap located below the valve seat, together with a bypass having its entrance relatively below the valve seat so as to permit the sand to settle down into said trap out of the path of the upwardly flowing fluid. The advantage of such an arrangement is the elimination of all the evils incident to the presence of sand in the flowing fluid, such sand cutting out the pump cups as well as wearing out the metal parts.

A further object of the invention is to provide the device in such form that the sand trap may be omitted or added thereto as is desired.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a vertical sectional view of a device constructed in accordance with my invention, Fig. 2 is a vertical sectional view of the guide member, Fig. 3 is a horizontal cross-sectional view taken on the line 3—3 of Fig. 1, Fig. 4 is a vertical sectional view of the upper member of the casing, Fig. 5 is a vertical sectional view of the base member, Fig. 6 is a plan view of the parts shown in Fig. 5, Fig. 7 is a horizontal cross-sectional view taken on the line 7—7 of Fig. 1, Fig. 8 is a vertical sectional view of another form of the invention in which the sand trap is omitted, Fig. 9 is an elevation of the tripping weight, Fig. 10 is an enlarged plan view of the cage and interior parts, the barrel being shown in section, Fig. 11 is an enlarged horizontal cross-sectional view taken on the line 11—11 of Fig. 8, Fig. 12 is a vertical sectional view showing the form of Fig. 8 with a sand trap attached thereto, Fig. 13 is a horizontal cross-sectional view taken on the line 13—13 of Fig. 12, Fig. 14 is a view showing the sand trap, partly in vertical section and partly in elevation, Fig. 15 is a vertical sectional view of still another form in which the invention may be carried out,

Fig. 16 is a horizontal cross-sectional view taken on the line 16—16 of Fig. 15, and Fig. 17 is an enlarged detail of the cage and component parts.

In the drawings the numeral 10 designates an upper casing member, or barrel, having a nipple 11 at its upper end into which the tubing 12 is screwed. At its lower end the barrel 10 is counter-bored and provided with an internal annular shoulder 13 and screw threads 14. A guide member 15 is fitted into the barrel and has an annular flange 16 at its lower end engaging under the shoulder 13 and fitting within the counter-bore of said barrel.

A base member, or head, 17 has its upper portion 17′ reduced in diameter and screw-threaded so as to be inserted in the lower end of the barrel and mesh with the threads 14, whereby the flange 16 is held against the shoulder 13 and the guide member rigidly supported. As is shown in detail in Figs. 1, 5 and 6, the head 17 is formed at one side with an inwardly extending boss, or enlargement, 18 and has its lower end 19 reduced to form a nipple which is internally screw-threaded for receiving a sand plug, or trap, 20. On opposite sides the head is formed with angular recesses 21 located at its upper end for receiving lugs 22 depending from the flange 16, whereby the member 15 is held against rotation independently of the head, the parts being assembled by screwing the barrel onto the head.

A curved duct 23 is formed at the lower portion of the enlargement 18 and extends through the head below the barrel. The upper portion of the enlargement is counter-bored at 24 and internally screw-threaded. An annular shoulder 25 is thus provided at the lower end of said counter-bore. A nipple 26 has its lower end screwed into the counter-bore 24 and acts to confine a circular screen 27 on a washer 28 which is carried by the shoulder 25. The screen being located at the upper end of the duct 23, will prevent trash and other foreign matter from flowing up into the nipple and getting into the device.

The guide member 15 is shown in detail in Figs. 2, 3 and 7. This member has an inclined guide 29 at its upper end, which is also concaved and overhangs a stud 30. The stud is located above and over the nipple 26 and has helical grooves 31 for receiving the upper convolutions of a coiled spring 32, which forms a valve cage. The lower end of the spring cage terminates immediately above a cap ring 33 screw-threaded on the upper end of the nipple 26 and engaging over the annular flange 34 of a bushing 35. The bushing is countersunk in the upper end of the nipple 26 and has its upper end exposed and finished to form a valve seat for a ball valve 36.

It will be seen that the valve 36 is confined within the spring cage 32 and is free to move vertically therein. In order to provide clearance, the stud 30 may have its under side provided with a concaved recess 37 for receiving the ball. The bushing 35 may be removed and replaced as desired, so as to provide a new valve seat. The screen 27 is accessible and may be renewed by removing the nipple 26. Parts which are likely to be cut out by the action of the sand are thus readily accessible and easily renewable.

It will be seen that the pump plunger (not shown) being located above the barrel 10, upon its upward stroke, will create a suction whereby the valve 36 will be lifted and fluid drawn through the duct 23, screen 27, nipple 26, bushing 35 and through the cage 32 into the barrel. Upon the down stroke of the plunger the valve 36 will be seated.

If the fluid is loaded with sand, or other mineral, such will settle by gravity downward around the nipple 26 and into the by-pass 38, formed between the enlargement 18 and the inner wall of the head 17. This sand, or other matter, will deposit in the plug 20 and thus be collected. The bottom of the plug is formed by a transverse partition 39, and said plug is preferably made in the form of a sleeve so that its lower end may be screwed onto an anchor tubing 40. Periodically the plug may be removed and the sand disposed of. This arrangement prevents, to a maximum extent, the sand and other mineral matter being carried upward into the tubing 12 and thus cutting out pump leathers and other parts.

One of the important features of my invention is the provision whereby the bleeding of the tubing 12 which extends to the top of the well, may be carried out. When it is desired to remove the tubing, it would, of course, be full of fluid because the valve 36 would be seated and the fluid could not escape. In order to bleed the tubing, a ball A is dropped down through the same into the barrel 10. This ball is deflected by the guide 29 and is of such diameter as to lodge between the spring cage 32 and the inclined lip 41 of the guide member 15. It will be seen that the ball valve 36 is confined within the lower end of the cage 32 and said lower end is not attached to the ring 33. Consequently, when a second ball B, or other weight, is dropped through the tubing into the barrel and strikes the ball A, the latter will be forced down the inclined lip 41, whereby the lower end of the cage 32 will be displaced, thus moving the ball valve 36 off of its seat and permitting the fluid to drain back through the cage, nipple 26 and duct 23.

When the device is brought to the surface, the barrel 10 may be unscrewed and the balls A and B removed, whereby the cage 32 will be restored to its normal position. The plug 20 may be removed at the same time.

In Figs. 8 to 11 I have shown another form in which the invention may be carried out and which form comprises a barrel 10' with a reduced externally screw-threaded nipple 11' at its upper end by which it may be connected with the tubing. At its lower end the barrel is counter-bored and internally screw-threaded at 14'. A base member or head 40 has its upper portion 41 reduced in diameter and screw-threaded so as to be inserted in the lower end of the barrel with its outer surface substantially flush with the outer surface of said barrel.

The base member has a tapering externally threaded pin 42 at its lower end, which is also provided with an internally threaded box 43. This arrangement permits the pin to be screwed into tubing, and tubing of smaller diameter to be screwed into the box 43. At the upper end of the box a counter bore 44 is formed and being of less diameter than the box may receive a still smaller tube. The head has a central bore 45 surrounded by a shoulder 46 on which a screen 47 is mounted. The portion 41 of the head is provided with a central screw-threaded socket 48 into which the lower end of a nipple 49 is screwed. This nipple, like the nipple 26, has a bushing 50 countersunk in its upper end and confined by a cap ring 51 screwed onto the nipple, as is shown in Fig. 8. The bushing is provided at each end with annular valve seats 52 and when one is worn, said bushing may be inverted to present a new seat.

At the upper portion of the barrel, I provide an internal annular shoulder 53 for receiving the lugs 54 of a valve cage 55. This valve cage is of open construction, as is shown in Figs. 8 and 10, having vertical ports 56 and a continuous ring 57 at its lower end. A coiled spring 58 resting on the head within the barrel engages the lugs 54, thus resiliently supporting the cage.

The lower end of the cage is spaced above the bushing 50 and confines a valve ball 59, which is free to move vertically in the cage, but engages on the seat 52 to close the valve. The upper end of the cage is reduced and provided with a central screw-threaded bore 60, for receiving the lower screw-threaded end of a stem 61, which is pointed at its upper end. The stem has a plurality of spaced transverse apertures 62 for receiving a locking pin 63 mounted in the cage and whereby the pin is fastened against rotation. The lower end 64 of the pin is rounded so as not to injure the ball 59 when the latter is displaced upwardly. By removing the pin 63 and adjusting the stem downwardly into the cage, the lower end 64 forms a stop for limiting the upward displacement of the valve, thus controlling the passage of fluid from the nipple 49.

It will be seen that by displacing the upper end of the stem 61 horizontally, the cage will be rocked on one of its lugs 54, whereby the ring 57 will be swung to one side, thus rolling the ball 59 from its seat 52. This rocking or canting of the cage will effectually unseat the valve for the purpose of bleeding the tubing. In Fig. 9 I have shown a tripping weight 65 which is oppositely bevelled at its ends, so that when it is dropped in the tubing, its lower bevelled end will engage the upper pointed end of the stem 61, and thus swing said stem to one side.

In Figs. 12, 13 and 14 I have shown another form, the upper portion of which is substantially the same as that shown in Fig. 8, the difference residing in the addition of a sand trap at the lower end. Instead of the head 40, an externally screw-threaded head 70 is engaged with the threads 14' and screwed into the lower end of the barrel 10'. This head has an annular surrounding flange 71 engaging the lower edge of the barrel and substantially flush therewith. A coupling collar 72 is screwed onto the head up against the flange 71. The lower end of the head has its screw-threaded box 73 and is reduced in diameter so as to co-act with an annular groove 74 in the collar to provide a passage for the upwardly flowing fluid.

Within the head I form a flaring fluid duct 75 at the bottom of which is a triangular bridge 76, as is shown in Fig. 14. This bridge seals the duct from the box 73 so that fluid may enter said duct on each side from the groove 74. An annular sand groove 77 surrounds the socket 48 so that sand which passes through the screen 47 and falling back into the barrel will be caught in said groove. Inclined lugs 78 are provided in the upper portion of the groove, as is best shown in Fig. 13, and are used to support the coiled spring 58. A pair of ducts 79 lead from the bottom of the groove 77 on opposite sides down through the head to the box 73. Any suitable sand collecting receptacle, such as the plug 20, may be screwed into the box 73. It will be noted that the head 40 can be disconnected from the barrel and the head 70 substituted therefor.

A further illustration of the flexibility of the invention is set forth in Figs. 15, 16 and 17, which are like the forms illustrated in Figs. 8 to 14 inclusive, except for the cage and bleeding means. In the last form, the cage 55' is similar to the cage 55 except that the lugs 54 are omitted, but ports 56' and a bottom ring 57' are provided. A sleeve 80 is fastened in the upper end of the nipple 11' and has a spider 81 at its lower end, as is shown in Fig. 16. A stem 82 is provided with a cap nut 83 and extends loosely through the spider with its lower end screwed into the top of the cage. The spider has a countersunk seat 84 for receiving an annular boss 85 at the upper end of the cage surrounding the stem. A collar 86 is pinned on the stem and rests upon a coiled spring 87 surrounding the stem and supported by the spider. This spring forces the stem upward and seats the boss 85, whereby the cage 55' is held in a central position.

The cap ring 51' is provided with a dished deflecting lip 88 engaging the lower rounded end 89 of the cage. It will be seen that by dropping a suitable weight with a flat bottom in the tubing so as to strike the upper end of the stem 82, said stem will be depressed downwardly against the tension of the spring 87. Upon a downward movement of the stem, the rounded end 89 of the cage will ride down the dished face of the lip 88, whereby said cage will be displaced laterally and the ring 57' will roll the ball 59 from its seat, thus opening the valve for bleeding the tubing.

Various changes in the size and shape of the different parts, as well as modifications and alterations, may be made within the scope of the appended claims.

What I claim, is:

1. In a device of the character described, an enclosure having a fluid inlet, a valve for closing said inlet, and a displaceable cage enclosing said valve.

2. In a device of the character described, an enclosure having a fluid inlet, a valve for closing said inlet, a displaceable cage enclosing said valve within said enclosure, and a sand trap connected with said enclosure and located below the valve.

3. In a device of the character described, an enclosure having a fluid inlet, a valve for closing said inlet, a displaceable cage enclosing said valve, and a screen below the valve.

4. In a device of the character described, an enclosure having a fluid inlet, a valve for closing said inlet, a cage enclosing said valve, a sand trap at the lower end of the enclosure, and a by-pass in the enclosure leading from the valve seat level to the trap.

5. In a device of the character described, an enclosure having a fluid inlet and a valve seat, a valve engaging said seat, and a resilient cage surrounding said valve and having its lower end free for displacement for dislodging said valve from its seat.

6. In a device of the character described, an enclosure having a fluid inlet and a valve seat, a ball valve engaging on said seat, and a resilient cage having its lower end surrounding said ball valve and free for displacement laterally to dislodge the ball from its seat.

7. In a device of the character described, an enclosure having a fluid inlet, a valve within the enclosure for closing the inlet, a by-pass leading downward from the valve seat level, and a plug at the lower end of the enclosure and to which the by-pass leads.

8. In a device of the character described, an enclosure having a fluid inlet and a valve seat above the inlet, a ball valve engaging on the valve seat, and a coiled spring having its upper end secured in the enclosure and its lower end surrounding the ball valve and free for lateral displacement for unseating the valve.

9. In a device of the character described, a head having a fluid inlet duct, a valve seat above the duct, a ball valve on said seat, a barrel on the head, a resilient cage surrounding the valve, a guide adjacent the cage, a sand trap below the valve, and a by-pass leading from the valve level to the trap.

10. In a device of the character described, a head having a fluid inlet duct, a valve seat above the duct, a screen between the inlet end of the duct and the valve seat, a ball valve on said seat, a barrel on the head, a resilient cage surrounding the valve, a guide adjacent the cage, a sand trap below the valve, and a by-pass leading from the valve level to the trap.

11. In a device of the character described, a head having a fluid inlet duct, a valve seat above the duct, a ball valve on said seat, a guide member mounted on the head, a barrel surrounding the guide and secured on the head, a resilient cage carried by the guide and having its lower end surrounding the valve and free for lateral displacement, and a deflecting guide in the barrel opposite the lower end of the cage.

12. In a device of the character described, a head having a fluid inlet duct, a valve seat above the duct, a ball valve on said seat, a guide member mounted on the head, a barrel surrounding the guide and secured on the head, a resilient cage carried by the guide and having its lower end surrounding the valve and free for lateral displacement, a deflecting guide in the barrel opposite the lower end of the cage, and a sand trap at the lower end of the head.

13. In a device of the character described, a head having a fluid inlet duct, a screen at the upper end of the duct, a nipple above the screen carried by the head and having a valve seat at its upper end, a barrel mounted on the head, a guide member in the barrel having a guide overhanging the valve seat, a coiled spring carried by the member under its guide and having its lower end surrounding the valve seat, but free for lateral displacement, a ball valve confined within the spring and engaging said seat, and an inclined guide lip opposite the lower end of the spring and the valve.

14. In a device of the character described, a head having a fluid inlet duct, a screen at the upper end of the duct, a nipple above the screen carried by the head and having a valve seat at its upper end, a barrel mounted on the head, a guide member in the barrel having a guide overhanging the valve seat, a coiled spring carried by the member under its guide and having its lower end surrounding the valve seat, but free for lateral displacement, a ball valve confined within the spring and engaging said seat, an inclined guide lip opposite the lower end of the spring and the valve, a by-pass leading downward in the head, and a sand plug at the lower end of the head.

15. As a sub-combination in a combined check valve, tubing bleeder and sand trap, a head, a barrel mounted on the head, and a guide member mounted on the head and within the barrel including an inclined guide overhanging a cage-suspending stud and a guide lip below the stud.

In testimony whereof I affix my signature.

WILLIAM H. McKISSICK.